(12) United States Patent
Li

(10) Patent No.: US 11,571,649 B1
(45) Date of Patent: Feb. 7, 2023

(54) HANDHELD SMOKE FILTER

(71) Applicant: Jiangbo Li, Shanxi (CN)

(72) Inventor: Jiangbo Li, Shanxi (CN)

( * ) Notice: Subject to any disclaimer, the term of this patent is extended or adjusted under 35 U.S.C. 154(b) by 0 days.

(21) Appl. No.: 17/645,880

(22) Filed: Dec. 23, 2021

(30) Foreign Application Priority Data

Dec. 16, 2021 (CN) .......................... 202111542284.3

(51) Int. Cl.
*B01D 46/62* (2022.01)
*B01D 39/20* (2006.01)
*B01D 46/00* (2022.01)

(52) U.S. Cl.
CPC ......... *B01D 46/62* (2022.01); *B01D 39/2058* (2013.01); *B01D 39/2068* (2013.01); *B01D 46/0004* (2013.01); *B01D 2265/028* (2013.01); *B01D 2279/00* (2013.01)

(58) Field of Classification Search
CPC ............... B01D 46/62; B01D 46/0036; B01D 39/2055; B01D 39/2058; B01D 39/2068; B01D 46/0002; B01D 46/0004; B01D 2265/028; B01D 46/0038; B01D 53/0415; B01D 2253/102

See application file for complete search history.

(56) References Cited

U.S. PATENT DOCUMENTS

| | | | | |
|---|---|---|---|---|
| 4,369,798 A | * | 1/1983 | Jackson .................. | A24F 13/02 131/330 |
| 4,838,901 A | * | 6/1989 | Schmidt .................. | B01D 46/30 95/287 |
| H1240 H | * | 10/1993 | Tardiff, Jr. ............. | B01D 46/62 55/323 |
| 5,678,576 A | * | 10/1997 | Nazaroff ................ | B01D 46/64 131/331 |
| 9,167,849 B2 | * | 10/2015 | Adamic ................... | A24F 13/06 |
| 2004/0128962 A1 | * | 7/2004 | Jeanfreau ............... | B43K 8/003 55/385.1 |
| 2008/0053435 A1 | * | 3/2008 | Pan ....................... | B63C 11/186 128/201.11 |
| 2013/0228190 A1 | * | 9/2013 | Weiss ...................... | A24F 13/14 131/331 |
| 2016/0089621 A1 | * | 3/2016 | Morris ................ | B01D 46/0002 55/495 |
| 2020/0041124 A1 | * | 2/2020 | White ..................... | F23Q 25/00 |

(Continued)

FOREIGN PATENT DOCUMENTS

| CN | 1167592 A | 12/1997 |
|---|---|---|
| CN | 1209052 C | 7/2005 |
| CN | 209612419 U | 11/2019 |

*Primary Examiner* — Robert Clemente

(57) ABSTRACT

The present invention provides a handheld smoke filter, the handheld smoke filter includes a housing, wherein one end of the housing is fixedly connected to a smoke spray inlet, the other end of the housing is fixedly connected to a bottom cover, the housing is provided inside with a filter element shell for filtering smoke, the filter element shell is provided with a first sponge layer, an activated carbon filter layer, a second sponge layer and an HEPA filter sequentially disposed from a filter element intake hole to a filter element exhaust hole. The handheld smoke filter of the present invention can use sponge, activated carbon and HEPA for multiple filtrations, so as to collect smoke sprayed from the mouth of a user more effectively, with better filtration effect and better air permeability.

8 Claims, 6 Drawing Sheets

(56) References Cited

U.S. PATENT DOCUMENTS

| | | | |
|---|---|---|---|
| 2020/0060332 A1* | 2/2020 | Hulbert | A24F 13/00 |
| 2021/0170313 A1* | 6/2021 | Abdalla | B01D 46/0004 |
| 2022/0023783 A1* | 1/2022 | Chen | B01J 20/20 |
| 2022/0026067 A1* | 1/2022 | VanTiem | B01D 46/0005 |

* cited by examiner

HANDHELD SMOKE FILTER

CROSS REFERENCE TO RELATED APPLICATION

This application claims priority benefit of Chinese Patent Application No. 202111542284.3, filed on Dec. 16, 2021, and the entire contents of which are incorporated herein by reference.

FIELD OF TECHNOLOGY

The present invention relates to the field of air filtration apparatuses, in particular to a handheld smoke filter.

BACKGROUND

Smoking is harmful to health. If a person in the family smokes, other members of the family can't avoid the harm of secondhand smoke. The harmful ingredients of secondhand smoke can exist in the air, dust and the surface of articles for a long time, and are not easy to dissipate. If smokers smoke frequently, non-smokers will be exposed to the secondhand smoke for a long time, which is very harmful. Therefore, in order to avoid the harm of secondhand smoke to non-smokers, it is necessary to develop a smoke filter for filtering secondhand smoke.

The existing smoke filters applied to secondhand smoke uses environmentally friendly cotton, activated carbon and other materials for filtration, which have poor air permeability and laborious use for users. Moreover, smoke spray inlets of some filters have poor sealing performance, and some secondhand smoke is directly sprayed into the air without filtering, resulting in poor filtering effect.

SUMMARY

In order to solve the above technical problems, the present invention provides a handheld smoke filter, which realizes that the smoke spray inlet of the filter is closer to the shape of the mouth, has good sealing, has better air permeability, has a plurality of filter layers, is small in volume and is convenient to carry.

In order to achieve the above purpose, the present invention provides the following technical solution:

a handheld smoke filter, including a housing, one end of the housing is fixedly connected to a smoke spray inlet, the other end of the housing is fixedly connected to a bottom cover, the housing is provided inside with a filter element shell for filtering smoke, the filter element shell includes a filter element intake hole disposed close to the smoke spray inlet and a filter element exhaust hole disposed close to the bottom cover, and a first, sponge layer, an activated carbon filter layer, a second sponge layer and an HEPA, filter are sequentially disposed from the filter element intake hole to the filter element exhaust hole.

Further, one end, of the smoke spray inlet is an injection end contacting a user, and the injection end of the smoke spray inlet is provided with anc notch bent from both ends to the middle.

By adopting the technical solution, the smoke spray inlet, is fitted with the shape of the mouth of the user, thereby avoiding the smoke from leaking from corners of the mouth and not entering the filter due to due to smoke spray inlet and the shape of the mouth being not fitted.

Further, an overall shape of the bottom cover is a box body provided with an opening at an upper end, and a plurality of elongated exhaust through holes are disposed at a bottom of the box body of the bottom cover.

With the above solution, the filtered gas can be smoothly discharged from the bottom cover via the provided exhaust holes.

Further, a material of the smoke spray inlet is provided as a flexible silica gel material.

The flexible silica gel material used in the above solution has soft properties that are less likely to hurt the user's mouth, fits the shape of the mouth better, and prevents the gas from leaking out when it is sprayed in.

Further, the other end of the smoke spray inlet is provided with a snap-in slot connected to the housing, and one end of the housing is provided with a mounting necking connected with the snap-in slot, and the snap-in slot snaps into the mounting necking.

With the use of the snap-in connection in above solution, a sealing of the connection between the smoke spray inlet and the housing is increased, and the smoke is prevented from leaking into the air without passing through the filter element. In addition, the snap-in is convenient for disassembling/installing the smoke spray inlet from/to the housing and replacing the filter element, and the appearance of the connection between the smoke spray inlet and the housing is arc-shaped, which is more beautiful.

Further, the other end of the housing is provided with an inner retracted edge disposed circumferentially along the opening of the one end of the housing, an outer surface of the inner retracted edge is provided with a fixing groove, the bottom cover is provided with fixing keys on surrounding side walls, and the fixing groove of the housing is stuck to the fixing keys of the bottom cover.

With the use of the installation and connection between the fixing groove and the fixing keys of the above solution, it is more convenient to pick the filter element.

Further, the outer surface of the housing is further provided with a plurality of anti-skid slots.

The anti-skid slot used in the above solution has an anti-skid function and prevents the filter from slipping from hands of the users during use.

Analysis shows that the present invention discloses a handheld smoke filter, in which the filter element sequentially uses a first sponge layer, an activated carbon filter layer, a second sponge layer and an HEPA filter, wherein the first sponge layer disposed in the outermost layer prevents the activated carbon from spilling into the user's mouth and also preventing the user's mouth liquid from entering the activated carbon filter layer. The activated carbon filter layer carries out the adsorbed or trapped materials in the pores of the carbon core by blowing, and purifies the air by desulfurization and denitrification. The second sponge layer separates the activated carbon filter layer from the HEPA filter, preventing activated carbon particles from entering the HEPA filter. The HEPA filter can filter particles with a particle size above 0.3 µm at a filtration efficiency up to 99.97%. A filtration material of the HEPA filter is usually selected as polypropylene fiber, polyester fiber or glass fiber, with a diameter of about 0.5-2.0 µm, which is mainly used to remove particles with a particle size above 0.5 µm through a microscopic flocculent structure.

BRIEF DESCRIPTION OF THE DRAWINGS

The accompanying drawings, forming part of the present application, serve to provide a further understanding for the present invention, and the exemplary embodiments of the present invention as well as the illustrations thereof serve to explain the present invention and do not constitute an undue limitation of the present invention. In the drawings.

ILLUSTRATIONS OF REFERENCE SIGN

Figure 1:
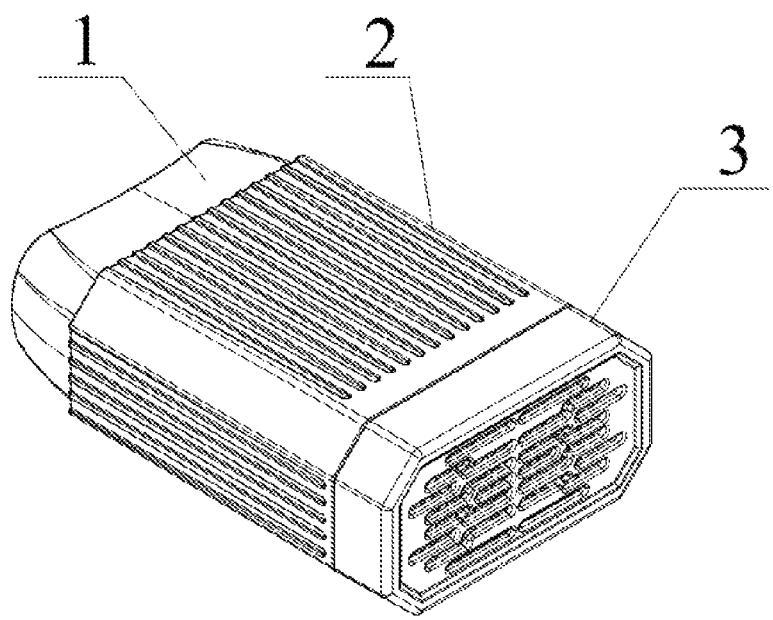
FIG. 1 is a structural diagram of a handheld smoke filter of the present invention.

1—smoke spray inlet; 2—housing; 3—bottom cover; 4—filter element shell; 11—arc notch; 12—snap-in slot; 21—mounting necking; 22—inner retracted edge; 23—fixing groove; 24—anti-skip slot; 31—exhaust-through hole; 32—fixing key; 33—limit strip; 40—hollow structure; 41—filter element intake hole; 42—filter element exhaust hole; 43—first sponge layer; 44—activated carbon filter layer; 45—HEPA filter; and 46—second sponge layer.

DETAILED DESCRIPTION OF THE EMBODIMENTS

The present invention will be described in detail below with reference to the accompanying drawings and in conjunction with embodiments. The various examples are provided by way of interpretation of the present invention and not limiting the present invention. Indeed, it will be apparent to those skilled in the art that modifications and variations may be made in the present invention without departing from the scope or spirit of the present invention. For example, features shown or described as part of one embodiment may be used in another embodiment to produce yet another embodiment. It is therefore desirable that the present invention encompass such modifications and variations falling within the scope of the appended claims and their equivalents.

In the description of the present invention, the terms "longitudinal", "transverse", "up", "down", "front", "back", "left", "right", "vertical", "horizontal", "top", "bottom" and the like denote orientation or positional relationships based on those shown in the drawings and are intended for ease of description only and not to require that the present invention must be constructed and operated in a particular orientation and therefore cannot be construed as limiting to the present invention. The terms "joint", "connect" and "set" used in the present invention should be understood in a broad sense, for example, may be a fixed connection or a detachable connection; it can be directly connection or indirectly connection through intermediate components; and it may be a wired electrical connection, a radio connection, or a wireless communication signal connection, and the specific meanings of the above terms may be understood by those of ordinary skill in the art according to a specific situation.

One or more examples of the present invention are shown in the accompanying drawings. The detailed description uses numeric and alphabetic markers to refer to features in the drawings. Similar or like reference signs in the drawings and descriptions have been used to refer to similar or like parts of the present invention. As used herein, the terms "first", "second" and "third" and the like are used interchangeably to distinguish one member from another and are not intended to denote the location or importance of individual members.

Figure 2:
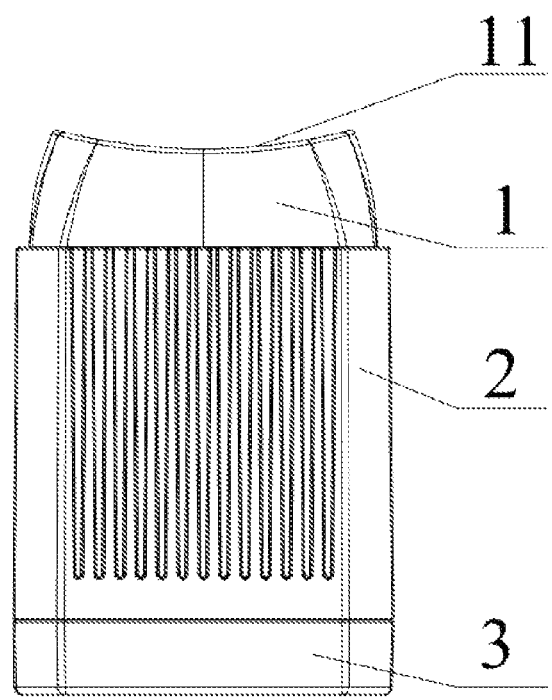
FIG. 2 is a front view of the handheld smoke filter of the present invention.
Figure 3:
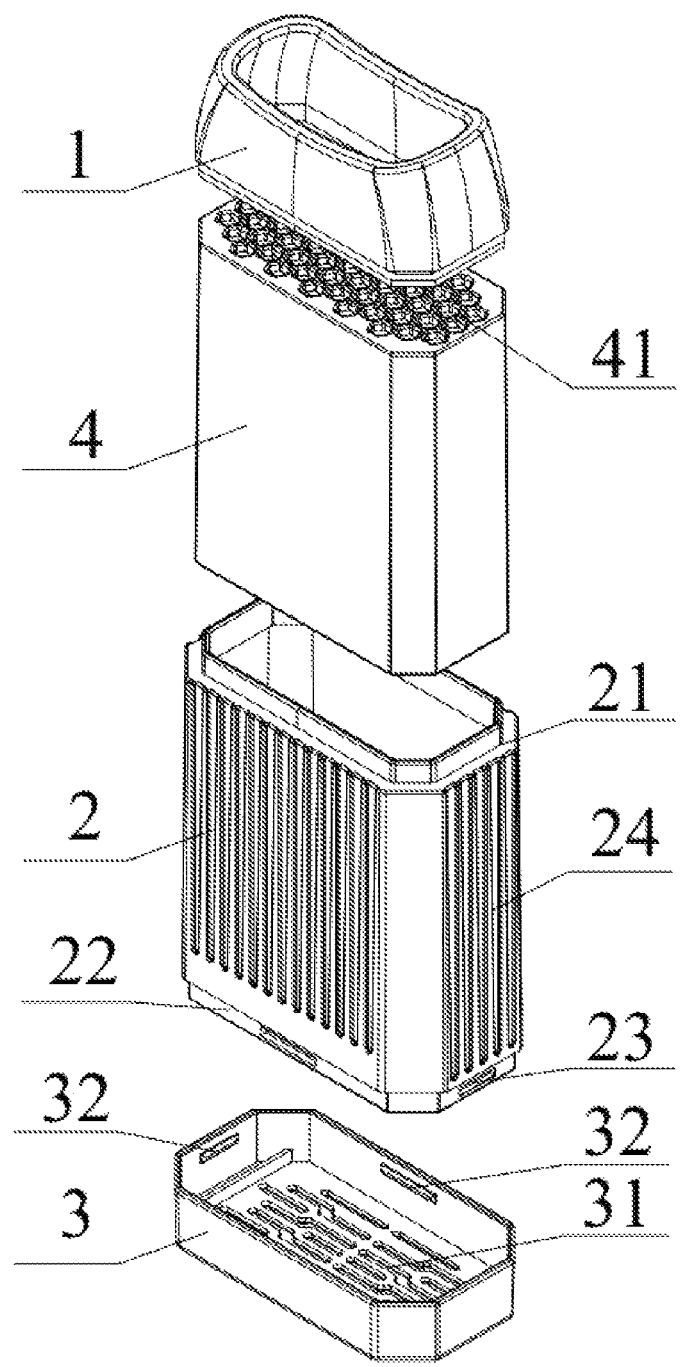
FIG. 3 is an explosive structure diagram of the handheld smoke filter of the present invention.
Figure 4:
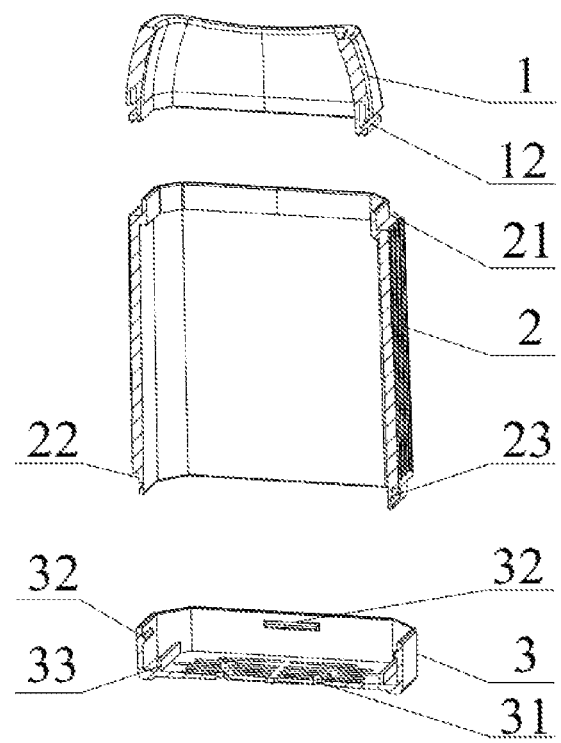
FIG. 4 is a sectional view of an external structure of the handheld smoke filter of the present invention.
Figure 5:
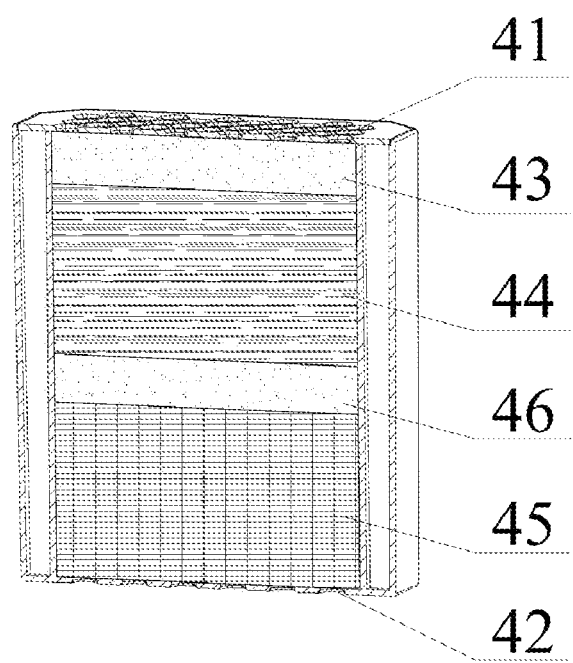
FIG. 5 is a sectional view of an internal structure of a filter element shell of the handheld smoke filter of the present invention.
Figure 6:
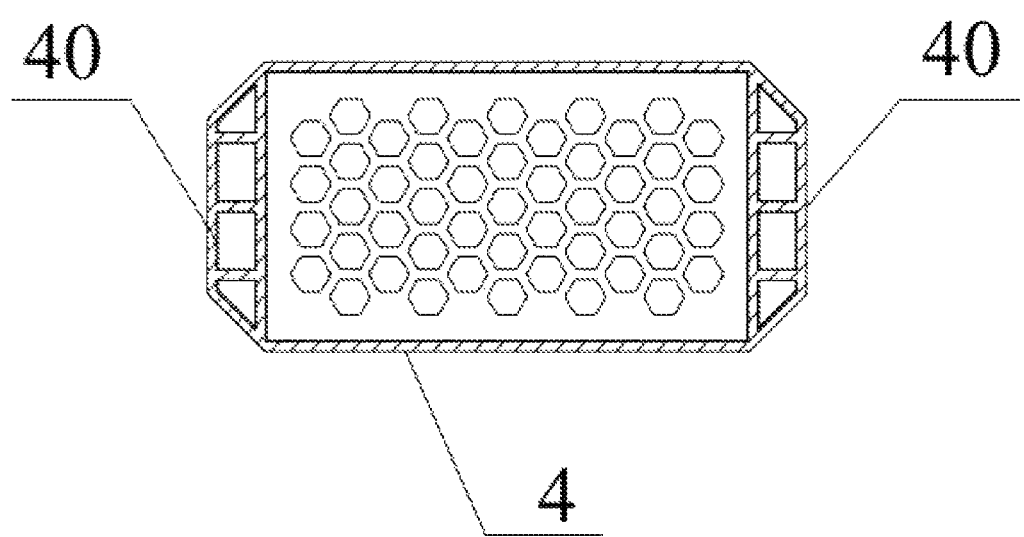
FIG. 6 is a cross-sectional structural diagram of the filter element shell of the handheld smoke filter of the present invention.

As shown in FIGS. 1 to 3, according to the embodiment of the present invention, a handheld smoke filter is provided, which includes a housing 2, a filter element shell 4 mounted inside the housing 2, a smoke spray inlet 1 fixedly mounted at an upper end of the housing 2, and a bottom cover 3 clamped at a lower end of the housing 2.

The smoke spray inlet 1 includes an injection end which is in contact with the mouth of the user and a connecting end which is connected to the housing 2. In order to enable the user to spray all the smoke into the smoke spray inlet 1, the injection end of the smoke spray inlet 1 is provided with an arc notch11 bent from both ends to the middle, and the arc notch11 fits with the shape of the mouth of the user, thus avoiding the smoke from leaking from the corners of the mouth and directly entering the air due to the smoke spray inlet and the shape of the mouth being not fitted.

The housing 2 has a shape of a square straight cylinder with two ends penetrating through, and chamfers are disposed at edges of the straight cylinder to facilitate holding. An upper end of the housing 2 is provided with an L-shaped mounting necking 21, and a lower end thereof is provided with an inner retracted edge 22, which is convenient to ensure that the overall outer surface is flat when the smoke spray inlet 1 and the bottom cover 3 are connected to the housing. Further, in order to ensure the sealing of the connection between the smoke spray inlet 1 and the housing 2, the connecting end of the smoke spray inlet 1 is provided with, a snap-in slot 12 having an L-shaped cross section, and the snap-in slot 12 is mated with the mounting necking 21. The smoke spray inlet 1 is made of flexible silica gel, an interference fit between the snap-in slot 12 and the mounting necking 21 allows for a tighter connection between the smoke spray inlet 1 and the housing 2 more closely, so that a sealing of the connection between the smoke spray inlet and the housing is increased, and the smoke is prevented from leaking into the air without passing through the filter element. In addition, the snap-in is convenient for disassembling/installing the smoke spray inlet from/to the housing and replacing the filter element.

The bottom cover 3 is a box body with an opening at an upper end, and a number of fixing grooves 23 are provided on the inner retracted edge 22 at a lower end of the housing 2 connected to the bottom cover 3, and the bottom cover 3 is provided with fixing keys 32 mating the fixing grooves 23 at the position of the corresponding fixing grooves 23, which further clips the bottom cover 3 to the housing 2. A bottom surface of the box body of the bottom cover 3 is provided with elongated exhaust through holes 31 to facilitate gas discharge.

The housing 2 is installed inside a filter element shell 4, one end of the filter element shell 4 close to the smoke spray inlet 1 is provided with a filter element intake hole 41, the other end of the filter element shell 4 is provided with a filter element exhaust hole 42, an overall shape and size of the exterior of the filter element shell 4 match that of the housing 2. The first sponge layer 43, activated carbon filter layer 44, second sponge layer 46 and HEPA filter 45 are disposed inside the filter element shell 4 from the filter element intake hole 41 to the filter element exhaust hole 42. The first sponge layer 43, disposed on an upper layer of the activated carbon filter layer 44, can not only filter part of the smoke particles, but also fix the activated carbon filter layer in the filter element shell 4 to prevent the activated carbon particles from leaking out. The second sponge layer 46, disposed between the activated carbon filter layer 44 and the HEPA filter 45, can isolate the activated carbon particles from the HEPA filter 45. After the smoke passes through the activated carbon filter layer 44, most harmful substances such as smoke tar, nicotine and, carbon monoxide are filtered out, and the smoke odor is adsorbed. Then, the smoke is deeply filtered through the HEPA filter 45, and the filtered gas is discharged into the air after passing through the filter element exhaust hole 42 and the exhaust through hole 31 at the bottom of the bottom cover 3. It should be noted that HEPA filter is a high efficiency air micromaterial filter, a kind of equipment used for air purification, the filter material is usually made of irregularly arranged chemical fibers, such as polypropylene fiber, polyester fiber or glass fiber, is generally used for filtering the microscopic flocculent structure of 0.3-2.0 μm in diameter, and can effectively filter out PM 2.5 particles in the air, and its filtering effect can reach 99.9%.

In order to make better circulation of smoke from the filter element and the bottom cover 3, two limit strips 33 are symmetrically arranged at the bottom of the inner side of the bottom cover 3, the limit strips 33 separate the filter element exhaust hole 42 of the filter element shell 4 from the exhaust through hole 31 at the bottom of the bottom cover 3 at a certain distance, which facilitates the circulation of smoke and makes it easy to replace the filter element.

In order to facilitate the uniformity and convenience of filling material inside the filter element in the production process, hollow structures 40 are disposed on both sides inside the filter element shell 4, so that the middle part for filling is rectangular in shape.

An outer surface of the housing 2 is also provided with a number of anti-skip slots 24, which can increase the friction on the surface of the filter to avoid slipping when held during use.

Table 1 is a comparison table of the main harmful gas content of smoke before and after the use of the handheld smoke filter

| Pollutants | Smoke gas before filtration | Filtered gas |
|---|---|---|
| Smoke tar (mg/piece) | 18.61 | 3.66 |
| Nicotine (mg/piece) | 1.161 | 0.431 |
| Benzo pyrene (μg/100 cm$^3$) | 24.4 | 6.6 |

Table 1 is a comparison table of the main harmful gas content of smoke before and after the use of the handheld smoke filter. The contents of smoke tar, nicotine and benzo pyrene in the smoke gas filtered by the handheld smoke filter of the present invention are greatly reduced compared with the contents of the, smoke gas before filtration.

From the above description, it can be seen that the above embodiment of the present invention realizes the following technical effects:

1. the housing and the smoke spray inlet are installed and fixed through the fitting of the mounting necking and the snap-in slot, which increases the sealing performance of the filter spray inlet and prevents the smoke from overflowing into the air without filtration; and 2. the filter element is filled inside with sponge, activated carbon layer and HEPA filter for quadruple filtration to improve the filtration effect, and two layers of sponges provided above and below the activated carbon can not, only prevent the activated carbon particles from being exposed, but also isolate the activated carbon particles from the HEM filter, which is convenient for installation.

Compared with the prior art, the handheld smoke filter of the present invention can more effectively collect the smoke sprayed into the user's mouth, and using the quadruple filtration of the double-layer sponge, the activated carbon layer and the HEM filter has better filtering effect and better air permeability during use.

The foregoing is merely a preferred embodiment of the present invention and is not intended to limit the present invention which may be subject to various modifications and variations to those skilled in the art. Any modification, equivalent replacement, improvement, etc., made within the spirit and principles of the present invention should be included in the scope of protection of the present invention.

What is claimed is:

1. A handheld smoke filter comprising a housing, wherein one end of the housing is fixedly connected to a smoke spray inlet, an other end of the housing is fixedly connected to a bottom cover, the housing is provided inside with a filter element shell for filtering smoke, the filter element shell comprises a filter element intake hole disposed close to the smoke spray inlet and a filter element exhaust hole disposed close to the bottom cover, and a first sponge layer, an activated carbon filter layer, a second sponge layer and an HEPA filter are sequentially disposed from the filter element intake hole to the filter element exhaust hole;

wherein an overall shape of the bottom cover is a box body provided with an opening at an upper end, and a plurality of elongated exhaust through holes are disposed at a bottom of the box body of the bottom cover; two limit strips are symmetrically arranged at a bottom of an inner side of the bottom cover, the two limit strips are configured to separate the filter element exhaust hole from the elongated exhaust through holes at a distance.

2. The handheld smoke filter according to claim 1, wherein one end of the smoke spray inlet is an injection end contacting a user, and the injection end of the smoke spray inlet is provided with an arc notch bent from both ends to a middle.

3. The handheld smoke filter according to claim 1, wherein a material of the smoke spray inlet is provided as a flexible silica gel material.

4. The handheld smoke filter according to claim 1, wherein an other end of the smoke spray inlet is provided with a snap-in slot having an L-shaped cross section connected to the housing, and one end of the housing is provided with an L-shaped mounting necking connected to the snap-in slot, and the snap-in slot snaps into the L-shaped mounting necking.

5. The handheld smoke filter according to claim 4, wherein the other end of the housing is provided with an inner retracted edge disposed circumferentially along an opening of the other end of the housing, an outer surface of the inner retracted edge is provided with a fixing groove, the bottom cover is provided with fixing keys on surrounding side walls, and the fixing groove of the housing is stuck to the fixing keys of the bottom cover.

6. The handheld smoke filter according to claim 1, wherein an outer surface of the housing is further provided with a plurality of anti-skid slots.

7. The handheld smoke filter according to claim 1, wherein each side of the filter element shell is provided with a hollow structure.

8. The handheld smoke filter according to claim 1, wherein the HEPA filter is an air micromaterial filter made of polypropylene fiber, polyester fiber or glass fiber.

\* \* \* \* \*